Patented Feb. 5, 1935

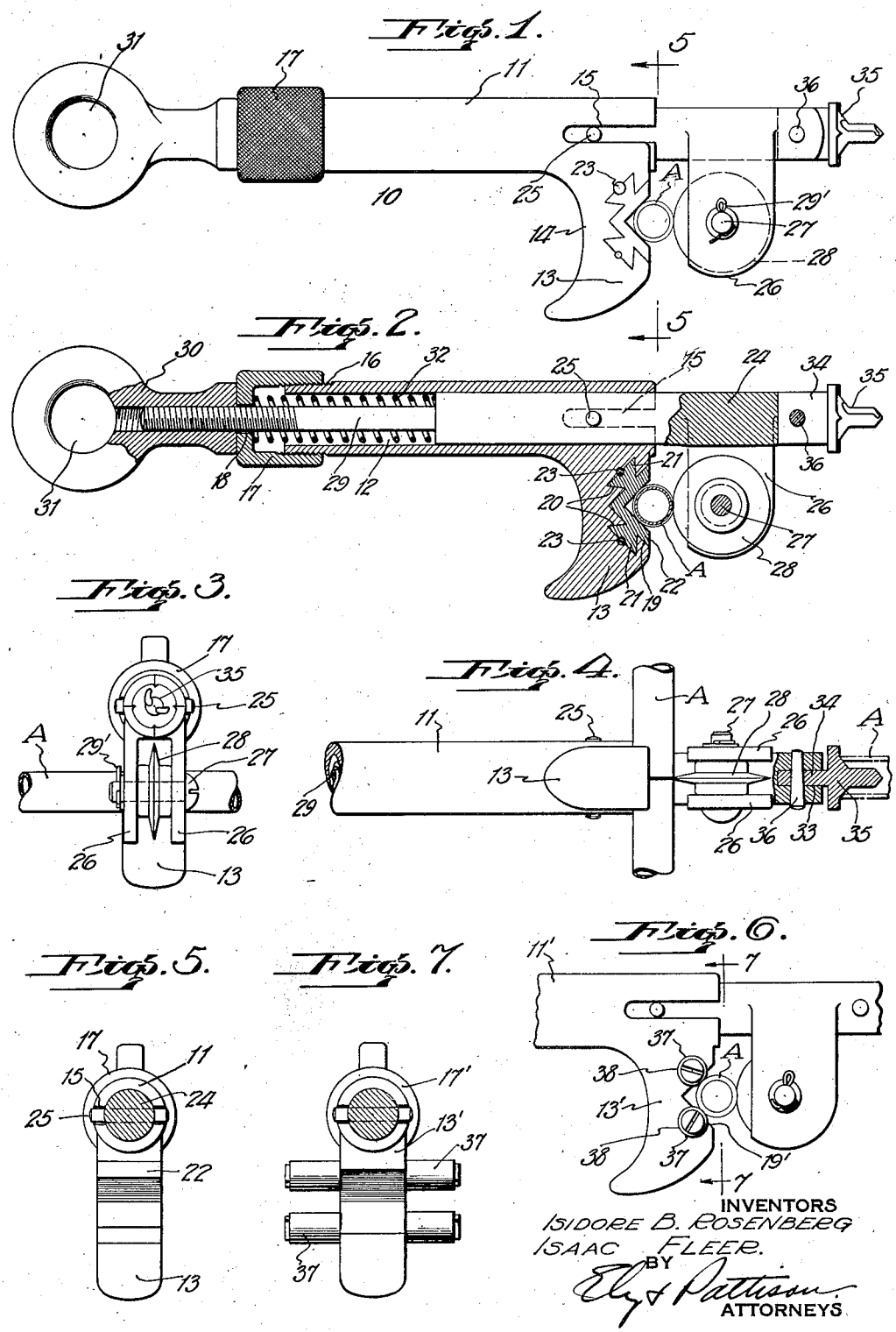

1,990,310

UNITED STATES PATENT OFFICE 1,990,310

CUTTING TOOL

Isidore B. Rosenberg, Port Chester, and Isaac Fleer, New York, N. Y.

Application July 30, 1932, Serial No. 626,495

1 Claim. (Cl. 81—189)

This invention relates to improvements in cutting tools and more particularly to an implement for the cutting of metal pipe or tubing.

One of the main features of the invention resides in a pipe cutting tool which may be held in the hand of an operator with the pipe to be cut positioned therein, and the tool turned about the pipe to cause a rotary cutting knife to cut through the walls thereof. The tool is especially adaptable for the cutting of soft metal pipes made of copper, brass, and like metals.

Another feature of the invention is to provide a pipe cutting tool in which the cutting knife is simultaneously fed toward the pipe during the turning of the tool about the axis of the pipe to compensate for the depth of the cut during a cutting operation.

A further object is the provision of a pipe cutting tool which also embodies a reamer to enable the cut end of a length of pipe to be reamed free of any rough edges or burrs which are formed thereon during the cutting operation.

A further object of the invention is to provide a tool having the above features which is simple of construction, inexpensive of manufacture, and easy of operation.

With these and other objects in view, the invention resides in the certain novel construction, combination and arrangement of parts, the essential features of which are hereinafter fully described, are particularly pointed out in the appended claim, and are illustrated in the accompanying drawing, in which:—

Figure 1 is a side elevational view of the invention with a pipe in position therein for cutting.

Figure 2 is a vertical longitudinal sectional view.

Figure 3 is an end elevational view.

Figure 4 is a fragmentary top plan view with parts in section and showing one end of a pipe in operative association with the reaming element.

Figure 5 is a vertical transverse sectional view on the line 5—5 of Figure 1.

Figure 6 is a fragmentary side elevational view of a modified form.

Figure 7 is a vertical transverse sectional view on the line 7—7 of Figure 6.

Referring to the drawing by reference characters, and particularly to Figures 1 to 5 inclusive, the numeral 10 designates the preferred embodiment of our invention in its entirety and which includes a tubular casing 11 having an internal bore 12 of uniform diameter throughout its length, while formed at one end of the tubular casing and extending at right angles to the axis thereof, is a head 13 formed with a finger stop 14. The same end of the tubular casing 11 is provided with inwardly extending oppositely disposed slots 15 while the opposite end of the tubular casing is externally screw threaded as at 16 for threadedly receiving a screw cap 17, the end wall of which is provided with an opening 18.

The outer face of the head 13 is provided with a V-shaped notch 19, and opening onto the angular walls of the said notch are dove tailed shaped transversely disposed grooves 20 which receive the dove tailed ribs or portions 21 of a removable V-shaped jaw 22. Pins 23 pass transversely through the dove tailed rib 21 for keying the removable jaw member 22 in position. By driving the pins free, the jaw elements 22 may be removed for replacement when desired.

Slidable in the bore 12 of the tubular casing 11 is a cylindrical carrier 24 which extends beyond the head end of the tubular casing and is provided with a transversely disposed pin 25, the ends of which extend into the respective slots 15. This pin tends to prevent turning of the carrier member 24 relative to the casing for a purpose to be hereinafter appreciated.

Extending at right angle from the outer extending end of the carrier 24 are spaced ears 26 in which a stub shaft 27 is mounted, while supported by the stub shaft is a rotary cutter or disc knife 28. Cotter pins 29 pass through the outer ends of the stub shaft 27 for securing the shaft in position and which permit the withdrawal of the shaft from its bearing in order to remove the cutting knife 28 for sharpening or replacement purposes.

Extending axially from the inner end of the cylindrical carrier 24 is a screw shaft 29, the free end of which passes through the opening 18 in the cap 17, and threadedly connects with a manipulating element 30 which acts in the capacity of a nut. The element 30 includes a finger ring portion 31 in which the finger of the hand of an operator is adapted to be inserted during the use of the tool in a manner to be presently explained. A coil spring 32 encircles the screw shaft 29 and is interposed between the inner end of the cylindrical carrier 24 and the end wall of the cap 17, and this spring tends to maintain the nut element 30 against the cap 17 and extends the carrier member 24 outwardly of the tubular casing upon the turning of the manipulating nut element 30 in one direction.

Turning of the nut element in an opposite direction will of course actuate the carrier 24 against the action of the spring 32.

In practice, assume that it is desired to cut a pipe or tube A to a desired length. The carrier member 24 is adjusted by the actuation of the manipulating element 30 to cause the rotary knife 28 to move outwardly to enable the pipe or tube A to be seated in the stationary jaw 22. When so seated, the manipulating nut element 30 is turned in an opposite direction to cause the carrier member 24 to move inwardly of the tubular casing until the knife edge engages the outer periphery of the pipe A. The pipe A is now held in clamped engagement with the stationary jaw and forms an axis about which the entire tool may be turned. In positioning the pipe or tube A into the tool, one hand of the operator grasps the tubular casing with the crotch portion of the hand between the thumb and forefinger disposed against the finger stop 14. With the pipe A clamped in the tool, the operator inserts a finger through the ring portion 31 of the nut element 30 and proceeds to impart a turning movement to the tool about the axis of the pipe A. During the turning of the tool about the pipe, the operator simultaneously imparts a turning movement to the nut element 30 sufficient to cause the inward movement of the carrier 24 in order that the rotary cutting knife 28 will move inwardly as the same cuts into the periphery of the pipe. Thus, the cutting knife is fed toward the pipe or tube during the rotation or turning of the tool about the axis of the pipe until the walls of the pipe or tube have been completely cut. For the cutting of a relatively thin pipe or tube, only a few turns of the tool about the axis of the pipe are necessary to effect a complete severing of the tube.

The outer free end of the cylindrical carrier 24 is bifurcated as at 33 for receiving an ear 34 extending from a reaming element 35. A pin 36 passes through the furcations and the ear 34 for securing the reaming tool in position. By reference to Figure 4 of the drawing, it will be seen that by inserting the reaming tool against the cut end of the pipe A, any burrs or uneven edge left upon the pipe by the cutting operation may be removed in order to leave the end of the pipe free and smooth of any uneven surface. The inner end of the slots 15 terminate at a proper position for engagement by the pins 25 in advance of the complete closing or inward movement of the carrier in order to prevent contact of the cutter 28 with the jaw 22, whereby to avoid any injury to the cutter.

In Figures 6 and 7 of the drawing, we have shown a slightly modified form wherein the head 13' formed on one end of the tubular casing 11' is provided with a V-shaped notch 19', and opening onto the angular walls of the notch are transversely disposed annular recesses or seats 37 in which rollers 38 are mounted. The peripheries of the rollers extend beyond the faces of the notch 19', while the ends of the rollers extend beyond opposite sides of the head 13' as best seen in Figure 7 of the drawing. By extending the rollers 37 beyond opposite sides of the head 13', a longer bearing surface is provided for the pipe A when in clamped position within the tool and furthermore the said rollers are free to turn during the turning of the tool about the axis of the pipe, thus reducing the amount of fricton between the fixed jaw and the pipe to be cut.

While we have shown and described what we deem to be the most desirable embodiment of our invention, we wish it to be understood that various changes as come within the scope of the appended claim may be resorted to if desired.

Having thus described the invention, what we claim as new and desire to secure by Letters Patent is:—

A pipe cutting tool comprising a tubular casing open throughout its length, a removable cap threaded to one end of the casing, an angular head provided on the opposite end of the casing, a jaw in the outer side of said head, a cylindrical carrier member slidably mounted in said casing, spring means tending to move one end of said carrier outwardly through the headed end of said casing, a cutter supported by the carrier and cooperating with the jaw for cutting a pipe positioned therebetween, a screw shaft extending from the inner end of said carrier member and passing freely through an opening in said cap, a manipulating nut threaded to the outer end of said screw shaft and held in abutting engagement with said cap by said spring means and a pin and slot connection between the carrier and said casing to prevent relative rotation therebetween, said pin engaging the inner end of the slot to form a stop in advance of the complete inward movement of the carrier to prevent contact of the cutter with the jaw.

ISIDORE B. ROSENBERG.
ISAAC FLEER.